Patented Jan. 8, 1952

2,582,128

UNITED STATES PATENT OFFICE 2,582,128

ALDIMINES

Melvin D. Hurwitz, Philadelphia, Pa., assignor to Rohm & Haas Company, Philadelphia, Pa., a corporation of Delaware No Drawing. Application February 11, 1950, Serial No. 143,834

7 Claims. (Cl. 260—566)

This invention relates to new classes of aldimines. It relates to aldimines or Schiff's bases in which every nitrogen atom is attached to a tertiary carbon atom.

These aldimines are very stable as compared to other Schiff's bases known heretofore and that this greater stability results from the particular structure of the aldimines. Because the compounds are so stable they can be readily purified, for example by distillation. They are capable of undergoing a wide variety of chemical reactions to produce in turn other new compounds, and because they are stable and do not undergo decomposition like ordinary aldimines the yields of the secondary products are unusually high. Thus, for example, they can be hydrogenated and thus converted into new classes of secondary amines containing tertiary carbon atoms.

All of the products of this invention contain the molecular configuration

wherein $C^1$ is a tertiary carbon atom connected to three other carbon atoms and all of the compounds are made by reacting a compound containing an aldehyde group, —CHO, with a compound containing a primary amino group, —NH₂, attached to a tertiary carbon atom. The reaction can be appreciated from the following representation of the course of the reaction:

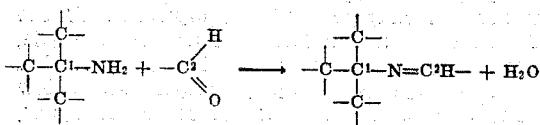

The largest class of the aldimines of this invention are those prepared from monoamines and monoaldehydes and which therefore contain one of the characteristic configurations shown above. But there are other new aldimines which contain a plurality of such configurations. Thus when a mole of a dialdehyde such as glyoxal is reacted with two moles of a tertiary alkyl amine the product contains two

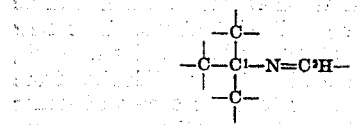

groupings. Two such groupings are also present in the products made from two moles of a monoaldehyde and one mole of a diamine such as diaminomenthane in which the two amino groups are each attached to tertiary carbon atoms. Furthermore, when a dialdehyde is reacted with a diamine in which the amino groups are on tertiary carbon atoms a linear polymer is formed which contains a large number of the characteristic groupings. Such resins are new and have real value.

As indicated above, the simplest class of these new aldimines includes those made from one mole of a monoaldehyde and one mole of a primary amine containing an amino group attached to a tertiary carbon atom. Such aldimines or Schiff's bases have the general formula

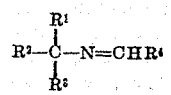

in which $R^1$, $R^2$ and $R^3$ represent monovalent organic radicals, preferably hydrocarbon radicals, and in which $R^4$ is a monovalent organic radical, preferably a hydrocarbon radical or a hydrogen atom. Furthermore, $R^1$ and $R^2$ taken together with the tertiary carbon atom can represent an aliphatic, cyclic, radical such as the cyclohexyl radical which carries the substituent $R^3$ and is attached directly to the nitrogen atom by the carbon atom which carries $R^3$. This type of aldimine is prepared according to the following equation by reacting a monoaldehydo compound of the general formula $R^4CHO$ with a monoamine having the general formula

in which formulas the R's have the same significance as is described above:

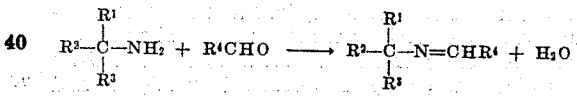

Careful study has shown that the groups or radicals which are represented by the four R's remain intact during the reaction and that the reaction does in fact take the course shown in the equation.

When a mole of a dialdehydo compound reacts with two moles of an amine the reaction takes the course which is shown in this equation:

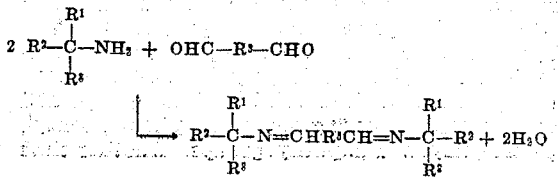

in which $R^1$, $R^2$ and $R^3$ have the significance described above, and $R^5$ is a divalent organic radical, preferably a hydrocarbon radical. The products are bis-Schiff's bases.

The reaction of a monoaldehyde and a diamine in which both of the amino groups are attached to tertiary carbon atoms is best illustrated by the reaction between diaminomenthane and benzaldehyde:

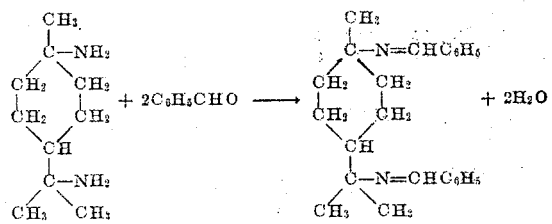

Examples of operable monoaldehydes which give rise to the $=CHR^4$ portion of the aldimines shown above includes formaldehyde, in which the group corresponding to $R^4$ in the general formulas is a hydrogen atom, and the following aldehydes in which the groups represented by $R^4$ are monovalent organic radicals, preferably hydrocarbon radicals: acetaldehyde, propionaldehyde, butyraldehyde, isobutyraldehyde, methylethylacetaldehyde, n-valeraldehyde, trimethylacetaldehyde, heptaldehyde, caprylaldehyde, pelargonic aldehyde, stearic aldehyde, acrolein, crotonaldehyde, vinylacetaldehyde, α-methylcrotonaldehyde, β-methylcrotonaldehyde, α,β-dimethylcrotonaldehyde, α,β-diethylcrotonaldehyde, citronellal, benzaldehyde, salicylaldehyde, m-nitrobenzaldehyde, p-chlorobenzaldehyde, phenylacetaldehyde, cinnamic aldehyde, furfuraldehyde, thiophenealdehyde, hexahydrobenzaldehyde, tetrahydrobenzaldehyde, tetrahydrotolualdehydes (o-, m- and p-), α- and β-naphthaldehydes, and endomethylenetetrahydrobenzaldehyde. All of the above aldehydes which are operable are characterized by having one aldehydo group, —CHO.

Dialdehydes which are used to produce bis-Schiff's bases are typified by the following: glyoxal, terephthalic aldehyde, isophthalic aldehyde, adipic aldehyde, pimelic aldehyde, sebacic aldehyde, succinic aldehyde, methylsuccinic aldehyde, gluturic aldehyde, 2,4-dimethyl-2-methoxymethylgluturic aldehyde, α-hydroxyadipic aldehyde, glutaconic aldehyde, and the like.

The amines which are operable are those which contain a primary amino group attached to a tertiary carbon atom. The preferred class of amines is made up of those individuals which have three monovalent hydrocarbon radicals attached to the tertiary carbon atom. That is, the preferred class of amines includes those amines in which the groups represented by $R^1$, $R^2$ and $R^3$ in the general formulas above are monovalent hydrocarbon radicals. These hydrocarbon radicals, which are represented by $R^1$, $R^2$ and $R^3$ can be alkyl, aryl, alkaryl, aralkyl or cycloalkyl groups. The aldimines of greatest current interest and utility are those in which the total number of carbon atoms in the groups represented by $R^1$, $R^2$ and $R^3$ is eighteen or less. The minimum number of course is three when $R^1$, $R^2$ and $R^3$ all represent methyl groups. Suitable hydrocarbon radicals are exemplified by the following: methyl, ethyl, isopropyl, tert.-butyl, sec.-amyl, 2-ethylhexyl, lauryl, hexadecyl groups and any isomers of these groups; and phenyl, benzyl, p-tert.-amyl and naphthyl groups. Another class of monoamines which are operable in the preparation of the aldimines of this invention includes those in which the tertiary carbon atom, shown as

or $C^1$ in the above formulas, and two of the R— groups, say $R^1$ and $R^2$, all taken together form an aliphatic ring, to one and the same carbon atom of which are attached both the primary amino group and the monovalent radical represented by $R^3$. That is to say, $R^1$ and $R^2$ can represent an alkylene group, preferably a polymethylene group, the terminal carbon atoms of which are attached to the tertiary carbon atom which carries the radical represented by $R^3$. Examples of such amines are the following:

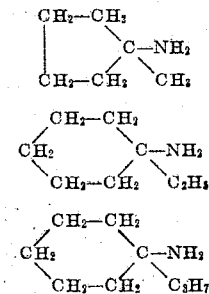

and the like.

Mixtures of the amines described above, particularly mixtures of isomeric amines, can be reacted with an aldehyde to produce a mixture of new Schiff's bases.

Diamines which react with monoaldehydes or dialdehydes to produce new aldimines and in which the two amino groups are attached to tertiary carbon atoms are exemplified by diaminomenthane, the formula of which is shown above, and 2,5-dimethyl-2,5-diaminohexane of the formula,

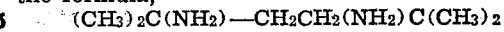

$(CH_3)_2C(NH_2)-CH_2CH_2(NH_2)C(CH_3)_2$

The reaction by which the new aldimines are produced takes place readily. Temperatures from —10° C. to 250° C. have been employed successfully at atmospheric pressure. At the very low temperatures it is advisable to employ a material such as solid potassium hydroxide, for example, to take up the water of reaction so that the reaction may proceed to completion. In the case of those aldehydes, such as acetaldehyde, which are proven to undergo aldol condensation it is advantageous to employ temperatures below about 100° C. In the case of other aldehydes, however, such as furfuraldehyde, temperatures up to the boiling point of the aldimine are satisfactory. Ordinarily catalysts are not required since the reaction of aldehyde and amine takes place readily. In some instances, the addition of a small amount of acid is advantageous in accelerating the reaction. The amines and the aldehydes react in the ratio of one mole of amine to each aldehydo group in a mole of aldehyde but it is evident that an excess of either can be used if desired. As indicated above, these new Schiff's bases are unusually stable. As a result, they can be separated without difficulty from the reaction mixture or from an excess of either reactant, and can be purified by distillation, preferably under reduced pressure.

The products of this invention are monomeric. This is especially surprising in the case of the reaction products of the amines and formaldehyde.

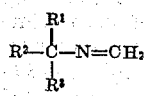

since the literature teaches that primary amines and formaldehyde give cyclic, trimeric Schiff's bases as the only stable products.

The following examples serve to illustrate how the products of this invention can be made.

*Example 1*

In a flask, equipped with a reflux condenser, thermometer and mechanical stirrer was placed 73 parts of tert.-butyl amine. To this was added with stirring 81 parts of 37% aqueous formaldehyde. The temperature rose spontaneously and the flask was cooled to prevent refluxing. The mixture was stirred for an additional half hour and was then cooled to room temperature. The organic material was separated from the heavier water layer and was dried over pellets of potassium hydroxide. The aqueous layer was found to contain less than 1% formaldehyde. It was then distilled through a short packed column at a rate such that the temperature of the vapor did not rise above 65° C., although the pot temperature varied between 112° and 118° C. The yield of 60 parts represented a 70% yield of tert.-butyl azomethine having a boiling point of 63°–65° C., a neutral equivalent of 87 (as against a calculated value of 85) and the formula $(CH_3)_3C-N=CH_2$. (The neutral equivalent is determined by the conventional method of titrating the product with 0.5 N sulfuric acid to a bromocresol green endpoint.)

*Example 2*

By the same procedure as that employed in Example 1, 87 parts of 37% aqueous formaldehyde and 129 parts of neopentyldimethylcarbinylamine were reacted. The organic material was separated from the aqueous layer, dried and distilled. A 95% yield (134 parts) was obtained of neopentyldimethylcarbinylazomethine having the formula

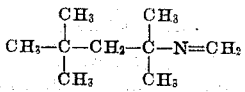

The product had a neutral equivalent of 140 as against a calculated value of 141 and on analysis it was found to contain the following: 76.32% carbon, 14.0% hydrogen, 10.22% nitrogen as against the following calculated values: 77.55% carbon, 13.5% hydrogen and 9.95% nitrogen.

In another reaction, an equivalent amount of paraformaldehyde was employed in place of the formaldehyde. While the product was identical to that of Example 2, the rate of reaction was much slower.

*Example 3*

In the manner described above, 81 parts of 37% aqueous formaldehyde and 185 parts of tert.-dodecylamine (isoheptyldiethylcarbinylamine) were reacted. The organic layer was treated as described above and a yield of 185 parts of tert.-dodecylazomethine was obtained which boiled over the range 125° to 140° C. at 10 mm. of pressure (Hg) and had a neutral equivalent of 199 as against a calculated value of 197. The analysis of the product confirmed that it had the formula

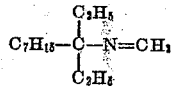

*Example 4*

By the same procedure 81 parts of 37% aqueous formaldehyde was added to and reacted with 213 parts of tert.-tetradecylamine (octylethylpropylcarbinylamine $$C_8H_{17}(C_2H_5)(C_3H_7)C-NH_2)$$

As in all cases, the reaction was exothermic and precautions were taken to prevent loss of reactants by vaporization. The product after being washed and dried was distilled under reduced pressure and 210 parts of t-tetradecylazomethine was collected within the boiling range of 156° to 187° C. at 40 mm. of pressure (Hg). This product had a neutral equivalent of 231 as against a calculated value of 225. The analysis of the product corresponded to that of the compound having the formula

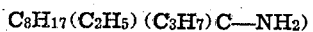

*Example 5*

To 5.9 parts of 37% aqueous formaldehyde was added 6.75 parts of α,α-dimethylbenzylamine and the mixture was shaken for five minutes. The reaction mixture was then extracted with benzene and the benzene solution was then fractionally distilled. Six parts of a fraction was collected at 92°–95° C. and 10 mm. of pressure (Hg). Its neutral equivalent was found to be 150 as against a calculated value of 147 for the compound having this formula:

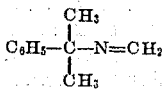

*Example 6*

A mixture of 9.0 parts of a 37% aqueous solution of formaldehyde and 8.45 parts of 1,8-diamino-p-menthane was shaken for 5 minutes. The water was then removed by the addition of pellets of potassium hydroxide and the dried organic material was distilled. Nine and one-half parts of p-menthane bis(azomethine) was collected. This product boiled at 115°–120° C. at 10 mm. of pressure and had a neutral equivalent of 95 as against a calculated value of 97 for the compound having this formula:

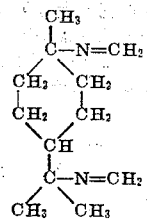

It will be noted that the use of the diamine gave rise to a bis-Schiff's base. In the next example the reaction of a dialdehyde with a monoamine is shown to yield a bis-product.

*Example 7*

A mixture was made of 194 parts of a 30% aqueous solution of glyoxal and 253 parts of neopentyldimethylcarbinylamine and the mixture was stirred for 0.5 hour. The reaction was exothermic. The organic layer was separated and distilled under vacuum and the fraction boiling at 80°–90° C. and 1 mm. of pressure was collected. This material had an analysis which agreed with that calculated for the bis(azomethine) having the formula:

$$CH_3-CH_2-\underset{\underset{CH_3}{|}}{\overset{\overset{CH_3}{|}}{C}}-N=CH-CH=N-\underset{\underset{CH_3}{|}}{\overset{\overset{CH_3}{|}}{C}}-CH_2-\underset{\underset{CH_3}{|}}{\overset{\overset{CH_3}{|}}{C}}-CH_3$$

Example 8

To 129 parts of neopentyldimethylcarbinylamine and 50 parts of toluene was added 96 parts of furfural. The temperature of the mixture rose spontaneously and water separated. The mixture was refluxed and the water which vaporized with the toluene was removed by means of a continuous separator. When 18 parts of water had been thus removed, the reaction mixture was distilled and the compound having the formula $$CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-N=CH-\underset{O}{\overset{CH---CH}{\underset{\diagdown \diagup}{\overset{\|\quad\|}{C}\quad CH}}}$$

and boiling at 138°–141° C. and 30 mm. of pressure was obtained in a 97% yield.

Example 9

In a modification of the process of Example 8, a mixture of 142 parts of neopentyldimethylcarbinylamine and 96 parts of furfuraldehyde was simply distilled to a pot temperature of 250° C. The residue was then distilled under reduced pressure and there was obtained a 93% yield of furfurylidene neopentyldimethylcarbinylamine, identical with the product of Example 8.

Example 10

To 142 parts of neopentyldimethylcarbinylamine and 150 parts of benzene was added 70 parts of crotonaldehyde. The mixture was heated and the water was removed as described in Example 8. The pot temperature never exceeded 105° C. The reaction mixture was then distilled under reduced pressure and a water-white liquid which boiled at 108°–111° C. was obtained in an 89% yield. The analysis of the product confirmed that the formula was the following:

$$CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-N=CH-CH=CH-CH_3$$

Example 11

By the process of Example 10, 142 parts of neopentyldimethylcarbinylamine and 72 parts of n-butyraldehyde were reacted in the presence of 150 parts of benzene. The product having the formula $$CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-N=CHCH_2CH_2CH_3$$

and boiling at 60° C. and 2.5 mm. of pressure was obtained in a 93% yield.

Example 12

By the procedure of Example 8, 129 parts of neopentyldimethylcarbinylamine and 126 parts of α-ethyl-β-propylacrolein were reacted to give an 82% yield of a product boiling at 141°–148° C. at 17 mm. whose analysis was that of the compound $(CH_3)_3CCH_2C(CH_3)_2N=CHC(C_2H_5)=CH(C_3H_7)$

Example 13

The process of Example 8 was followed in reacting 142 parts of 3,5,5-trimethylhexanal and 129 parts of neopentyldimethylcarbinylamine. The product, which boiled at 80°–94° C. at 0.2 mm. of pressure, represented an 82% yield of $(CH_3)_3CCH_2C(CH_3)_2-N=$
$\qquad CHCH_2CH(CH_3)CH_2C(CH_3)_3$

Example 14

When 110 parts of tetrahydrobenzaldehyde was reacted with 142 parts of neopentyldimethylcarbinylamine by the procedure of Example 10 there was obtained a 70% yield of the compound $$(CH_3)_3CCH_2C(CH_3)_2-N=CH-CH\underset{CH_2-CH_2}{\overset{CH_2-CH_2}{\diagup \diagdown}}CH$$

Example 15

A mixture of 106 parts of benzaldehyde and 129 parts of neopentyldimethylcarbinylamine was allowed to stand overnight at room temperature. The reaction mixture was then distilled under reduced pressure and a 78% yield was obtained of the compound $(CH_3)_3CCH_2C(CH_3)_2-N=CHC_6H_5$ which boiled at 129°–131° C. and 8 mm. of pressure.

Example 16

To 73 parts of tert.-butylamine there was added dropwise 72 parts of n-butyraldehyde while the temperature was maintained at −5° C. Solid potassium hydroxide was then added in order to take up the water of reaction. After an hour the reaction mixture was distilled under reduced pressure and the product $(CH_3)_3C-N=CHCH_2CH_2CH_3$ which boiled at 55° C. and 20 mm. of pressure, was obtained in a 92% yield.

Example 17

A 65% yield of $(CH_3)_3C-N=CHCH_3$ was obtained by reacting 44 parts of acetaldehyde and 73 parts of tert.-butylamine by the process of Example 16 and thereafter distilling the product.

Example 18

A mixture of 106 parts of benzaldehyde and 73 parts of tert.-butylamine was allow to stand overnight at room temperature. The reaction mixture was then distilled under reduced pressure and a 63% yield of the compound $(CH_3)_3C-N=CHC_6H_5$ was obtained.

Example 19

To a mixture of 101 parts of a mixture of hexylamines (containing approximately 40% methyldiethylcarbinylamine, 45% dimethylpropylcarbinylamine and 15% dimethylisopropylcarbinylamine) was added 73 parts of isobutyraldehyde while the temperature was maintained below 50° C. The mixture was treated with 8 parts of solid potassium hydroxide below 30° C. and after an hour the organic layer was separated and distilled under reduced pressure. The fraction boiling at 75°–95° C. and 25 mm. of pressure was a water-white liquid whose analysis corresponded to that calculated for a compound of the empirical formula $C_{10}H_{21}N$.

Example 20

To 113 parts of 1-methyl-1-aminocyclohexane was added 96 parts of furfural. An exothermic reaction occurred which carried the temperature to 65° C. Potassium carbonate was added in order to "salt out" the water and the organic layer was then dried over potassium carbonate and finally distilled under reduced pressure. The product boiled at 125°–135° C. at 30 mm. of pressure and had a neutral equivalent of 192 as against a theoretical value of 191 for the compound

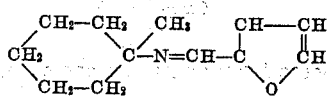

Example 21

While the temperature was maintained below 35° C. by means of external cooling, 97 parts of a 30% aqueous solution of glyoxal was added with stirring to 80 parts of tert.-butylamine. The mixture was then allowed to stand overnight at room temperature. The mixture was next saturated with solid potassium carbonate and the organic layer which separated was removed and dried over potassium carbonate. The dried product was distilled under reduced pressure to give a bis-Schiff's base of the formula $$(CH_3)_3C-N=CHCH=N-C(CH_3)_3$$

which boiled at 80°–90° C. at 25 mm. of pressure.

Example 22

The procedure of Example 21 was followed with one exception namely that 150 parts of neopentyldimethylcarbinylamine was substituted for the tert.-butylamine. The product boiled at 90° C. and 1 mm. of pressure and its analysis corresponded to that calculated for the bis-Schiff's base of the formula $$(CH_3)_3C-CH_2-C(CH_3)_2-N=CH-$$
$$CH=N-C(CH_3)_2-CH_2-C(CH_3)_3$$

Example 23

The procedure of Example 21 was followed in reacting 135 parts of α,α-dimethylbenzylamine with 97 parts of a 30% aqueous solution of glyoxal and in isolating the product. The material which boiled at 180°–200° C. and 1 mm. of pressure had the formula $$C_6H_5-C(CH_2)-N=CH-CH=N-C(CH_2)C_6H_5$$

as evidenced by analysis.

Example 24

To 20 parts of tert.-butylamine, dissolved in 30 parts of benzene was slowly added 17.2 parts of 2,4-dimethyl-2-methoxy-methylglutaric aldehyde. The mixture was then maintained at 50° C. for 4 hours after which it was stripped to 100° C. at 15 mm. of pressure to free it of benzene, water and excess amine. The liquid residue had a neutral equivalent of 149 as against a value of 141, calculated for the compound having the formula

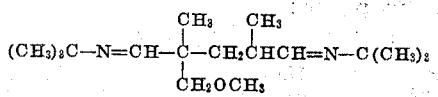

Example 25

Seventeen parts of freshly distilled sebacic aldehyde was dissolved in 50 parts of benzene and was added slowly with stirring to 30 parts of neopentyldimethylcarbinylamine. The mixture was heated to reflux and 3.5 parts of water was removed azeotropically. The reaction mixture was then heated to 120° C. at 10 mm. of pressure and the solvent and excess amine were thus removed. The residue which amounted to 38 parts had a neutral equivalent (196) and an analysis which agreed with that calculated for the compound of this formula:

$$(CH_3)_3C-CH_2-C(CH_2)-N=CH(CH_2)_8CH=$$
$$N-C(CH_2)-CH_2-C(CH_3)_3$$

Example 26

Terephthalaldehyde (13.4 parts) was mixed with 100 parts (a large excess) of neopentyldimethylcarbinylamine. The reaction mixture was heated to reflux and 3.5 parts of water was removed azeotropically. The mixture was then cooled and 30 parts of a compound crystallized from the excess of amine solvent. This compound had a melting point of 84°–85° C.

Example 27

42.6 parts of the dialdehyde, obtained by the esterification of ethylene glycol with α-ethyl-α-aldehydo-octoic acid, was mixed with 26 parts of neopentyldimethylcarbinylamine. The mixture was warmed and water separated. Fifty parts of toluene was added and the water was removed azeotropically. The mixture was then stripped to 150° C. and 1 mm. to yield an amber viscous liquid whose analysis agreed with that calculated for the compound having the formula

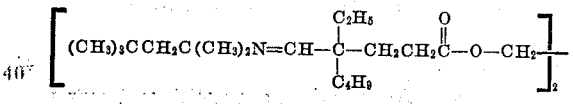

Example 28

A mixture of 9.0 parts of a 37% aqueous solution of formaldehyde and 7.2 parts of 2,5-diamino-2,5-dimethylhexane was shaken for 5 minutes. The water was then removed by the addition of pellets of potassium hydroxide and the dried organic material was distilled. Seven and a half parts of product was obtained which boiled at 90°–100° C. and 25 mm. of pressure. It had a neutral equivalent of 88 (as against a calculated value of 84) and its analysis confirmed this formula:

$$CH_2=N-\underset{\underset{CH_3}{|}}{\overset{\overset{CH_3}{|}}{C}}-CH_2CH_2-\underset{\underset{CH_3}{|}}{\overset{\overset{CH_3}{|}}{C}}-N=CH_2$$

Example 29

To 85 parts of 1,8-diamino-p-menthane, dissolved in 100 parts of toluene, was added 142 parts of 3,5,5-trimethylhexanal. The reaction mixture was heated to reflux and 18 parts of water was removed azeotropically. The reaction mixture was stripped to a final pot temperature of 150° C. at 1 mm. of pressure and 203 parts of a pale yellow liquid remained as residue. This product had a neutral equivalent of 216 (calculated=209) and analysis showed the compound to have the structure

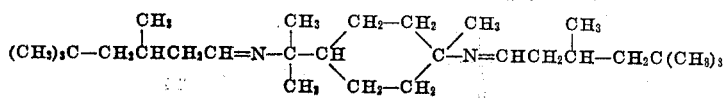

Examples 30–32

The procedure of Example 29 was followed in reacting 96 parts of furfural, 126 parts of 2-ethylhexanal and 106 parts of benzaldehyde respectively with 85 parts of 1,8-diamino-p-menthane. In every instance analysis of the resulting liquid products corresponded respectively to the formulas shown below and yields of at least 92% were obtained:

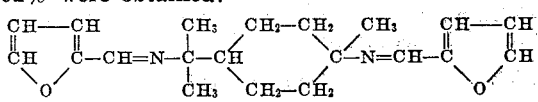

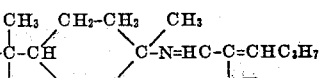

Example 33

Forty-four parts of acetaldehyde was added dropwise to 85 grams of 1,8-diamino-p-menthane while the temperature was held below 5° C. by means of an ice-salt bath and the mixture was held at 5° C. for four hours. The reaction mixture was then saturated with solid potassium hydroxide and the organic layer was dried over potassium hydroxide. The product was then distilled at 1 mm. of pressure and a water-white liquid which boiled at 100°–110° C. and 1 mm. was obtained which analysis showed to have the following formula:

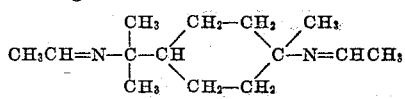

I claim:

1. A process for making azomethines having the general formula

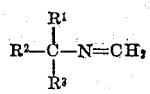

in which $R^1$, $R^2$ and $R^3$ represent monovalent hydrocarbon radicals and in addition $R^1$ and $R^2$ taken together with the tertiary carbon atom represent a cycloaliphatic radical which carries the group $R^3$ on the same carbon atom which is joined to the nitrogen atom, which process comprises reacting equimolar amounts of formaldehyde and a primary amine having the general formula

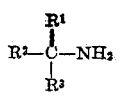

in which $R^1$, $R^2$ and $R^3$ are identical with the same characters described above.

2. A process for making azomethines having the general formula

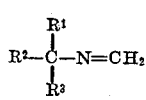

in which $R^1$, $R^2$ and $R^3$ represent alkyl groups, which process comprises reacting equimolar amounts of formaldehyde and a primary amine having the general formula

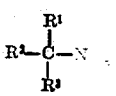

in which $R^1$, $R^2$ and $R^3$ are identical with the same characters described above.

3. A process for making the azomethine of the formula

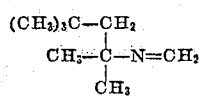

which comprises reacting equimolar amounts of formaldehyde and the amine of the formula

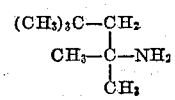

4. A process for making the azomethine of the formula

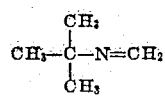

which comprises reacting equimolar amounts of formaldehyde and tertiary-butylamine.

5. A process for making the azomethine of the formula

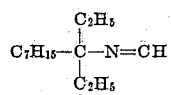

which comprises reacting equimolar amounts of formaldehyde and the amine of the formula

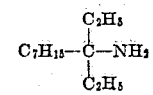

6. A process for making the azomethine of the formula

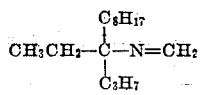

which comprises reacting equimolar amounts of formaldehyde and the amine of the formula

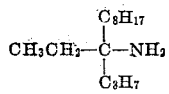

7. A process for making the azomethine of the formula

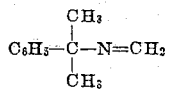

which comprises reacting equimolar amounts of formaldehyde and the amine of the formula

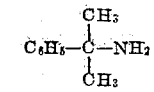

MELVIN D. HURWITZ.

REFERENCES CITED

The following references are of record in the file of this patent:

UNITED STATES PATENTS

| Number | Name | Date |
| --- | --- | --- |
| 2,421,937 | Haury | June 10, 1947 |
| 2,468,593 | Dorman | Apr. 26, 1949 |